United States Patent Office 3,437,605
Patented Apr. 8, 1969

3,437,605
METHOD OF PREPARING A SUPPORTED CATALYST
Carl D. Keith, Summit, N.J., assignor to Engelhard Industries, Inc., Newark, N.J., a corporation of Delaware
No Drawing. Filed Jan. 26, 1965, Ser. No. 428,208
Int. Cl. B01j 11/34
U.S. Cl. 252—463                    5 Claims

ABSTRACT OF THE DISCLOSURE

In a catalytic structure consisting of a preformed substrate with an alumina coating and a catalyst deposited on the coating, the alumina coating is formed by applying finely divided aluminum powder dispersed in an organic vehicle to a preformed substrate, treating the coated substrate with steam at elevated temperature and pressure and calcining the resultant alumina.

---

This invention relates to a novel method for the preparation of formed structures having an aluminum oxide surface, and particularly concerns a method for the production of a hard, adherent aluminum oxide coating on a preformed substrate. Such structures have utility in a wide variety of catalytic reactions, and may be used as igniters, as catalysts for oxidation reactions, in fume abatement or other gas purification processes and the like. In one aspect of the invention, the substrate supporting the alumina oxide coating can be of a combustible or otherwise destructible material, so that the invention can be employed to prepare structures consisting essentially of aluminum oxide.

There have been disclosed in the prior art numerous methods for the preparation of formed structures having an aluminum oxide surface. For example, it is known to prepare hard, wear, and corrosion-resistant aluminum oxide films on aluminum and aluminum alloys by electrolytic oxidation of the aluminum and aluminum alloys. Where the substrate is other than aluminum, for example impervious materials such as metal, porcelain or the like, aluminum oxide coatings can be prepared by dipping the support into a slurry or slip of finely-divided particles of aluminum oxide, followed by drying of the coated article. Aluminum oxide coatings have been prepared by dipping a shaped support into an aqueous solution of an appropriate salt such as aluminum nitrate, drying and subsequently heating the article to decompose the salt into aluminum oxide. Aluminum oxide coatings have also been prepared by flame spraying the oxide on a substrate. Previous attempts to make high purity aluminum coatings have resulted in non-adherent, powdery coatings.

In accordance with the present invention, formed structures having an aluminum oxide coating are prepared by applying a suspension of finely-divided aluminum in an organic medium, for example aluminum paint, to a preformed substrate, evaporating a substantial part of the organic medium and treating the dried structure with steam at elevated pressure for a period of time sufficient to convert the finely-divided aluminum to aluminum oxide. The initially formed aluminum oxide may consist of one or more known transitional forms of alumina or alumina hydrate, and can be converted, if desired, to alpha-alumina by further heating at elevated temperatures. The aluminum oxide coatings formed in accordance with the present invention have been found to be unexpectedly firmly bonded and adherent to the supporting structure.

The substrate which is employed in the present process may be metallic, e.g. stainless steel, Nichrome, nickel, metals of the platinum group, etc., all of which metals are resistant to oxidation. Alternatively, aluminum or aluminum alloys may be employed, and the substrate will then be itself converted in whole or in part to aluminum oxide. The resultant coating is particularly adherent. Where aluminum is employed as the substrate in sufficiently thin form, the entire structure can be converted to a formed alumina article.

The substrate can alternatively be composed of a non-metal, e.g. carbon, graphite, or any organic carrier, rigid or flexible, such as plastic film or web, paper, cloth, etc. Such substrates can be destructively removed from the formed article by high temperature combustion, thus providing a formed article consisting essentially of aluminum oxide.

The substrate may be preformed into any shape desired, for example in the form of a screen, mesh or expanded metal. When the coated article is to be used as a catalyst, the structure may be designed for a cross flow or radial flow type reactor. For example, aluminum paint can be applied to an organic carrier, such as paper, and the paper corrugated in known manner, and layers of the corrugated paper or other support assembled to form honeycomb structures of known type. Upon conversion of the aluminum paint to alumina and subsequent destructive combustion of the carrier and sintering of the aluminum oxide, a honeycomb ceramic structure consisting essentially of aluminum oxide is formed.

The surface of the substrate should be free of dirt, grease, and loose particles. It may be cleaned by any of the well known methods, e.g. brushing, sandblasting, treating with steam or solvent. The surface of the cleaned substrate should be thoroughly dry before applying the paint.

The aluminum powder is applied to the substrate in the form of a powder suspended or dispersed in an organic vehicle. The vehicle improves the ease of application and increases the adherence of the coating. Any vehicle which will volatilize or burn off at suitable temperature is suitable, for example, the aluminum may be applied in the form of a commercial type paint containing aluminum particles as the pigment component. The aluminum in such paints is ordinarily finely-divided and, for the purpose of this invention, should have a particle size of 90 percent below 50 microns. The concentration of the aluminum particles in the vehicle is not critical, and is ordinarily adjusted so as to enable application of the material by conventional techniques such as brushing, spraying or dipping. More than one application may be made so as to increase the thickness of the deposited aluminum coating.

Generally, the vehicles used for aluminum paints and other aluminum coatings are chosen for their film forming properties, and are well known to those skilled in the art of formulating paints. Such vehicles may vary greatly For example, one of the oldest aluminum paints consisted of aluminum powder in nitrocellulose and amyl acetate. Complicated formulations which contain, for example, oil varnish, vinyl lacquer, silicone resins, water-based acrylates, etc. are well known. Typical vehicles include mixture of two or more of the following ingredients: Oils, such as linseed oil, tung oil, castor oil, or oiticica oil; natural resin, such as Manila or East India Copal; synthetic resins such as ester gum, coumarone, phenolics, vinyls, acrylics, alkyds, and silicones, and solvents such as methyl ethyl ketone, cyclohexanone, ethyl acetate, amyl acetate, Cellosolve, butanol, nitrobenzene, toluene, xylene, xylol, petroleum ether, carbon tetrachloride, chloroform, and mineral spirits.

Aluminum powder may be mixed with the vehicles as a powder or as a paste. Commercial pastes, which may be used in formulating paints, contain about 60–75% metal, often in flake-like form, in mineral spirits usually containing stearic acid. Typically, about 2 to 3 pounds of aluminum paste-gallon of vehicle are used.

An example of a paint that can be used is −325 mesh aluminum powder dispersed in a solution of 40% (by weight) pine rosin in turpentine. In such case, a substantial part of the vehicle can be volatilized at temperatures below about 300° C., preferably in an inert atmosphere. Vehicles may be volatilized before steam treatment or the vehicle may be substantially non-volatile. It is preferred, however, that the film forming vehicle be such that a continuous vehicle film is not formed so as to protect and completely inhibit oxidation of the aluminum in steam. In the case of a non-volatile vehicle, the vehicle may be burned out prior to or after reacting the aluminum with steam. For example, aluminum coatings may be used which are formulated with aqueous acrylic emulsions which can be burned out in a controlled atmosphere at temperatures of 450–500° C., leaving no ash or carbon residue. When the aluminum is coated with a thin oxide layer it is beneficial to subject the aluminum coating to a light acid etch before steam treatment.

Where the finished structure is to be employed as a catalyst, it may be desirable to add one or more known additives to the alumina so as to provide an alumina oxide surface having certain desired properties. Other oxides, e.g. chromia, thoria, boria, titania and the like may be admixed with the aluminum powder, e.g. to impart strength to the coatings.

In the preparation of the coated article, the substrate suitably coated with an adherent film of aluminum particles is placed in a heated pressure vessel and treated with saturated steam for a sufficient period of time to convert the aluminum to aluminum oxide. Pressures of about 50 to 1000 p.s.i.g. and temperatures of about 100° to about 400° C. are suitable, but more elevated pressure and/or temperatures may be employed. Ordinarily, temperatures between about 150° and 300° C. and pressures up to about 300 p.s.i.g. are sufficient to effect complete conversion of the aluminum powder to alumina in reasonable periods of time, e.g. up to about 24 hours, but it will be appreciated that the time can be considerably shortened by using more elevated temperatures and pressures within the stated ranges. The steam may be introduced in an oxygen-containing stream such as air, or in inert gas, preferably at steam partial pressures such that the gas stream is saturated. The treatment of the aluminum powder with steam is preferably effected in the presence of an alkali or acid, for example ammonia, or volatile carboxylic acid may be added to the steam. Alternatively, an alkali or acid may be added to the coated structure or the coated structure may be placed on a support which can supply alkali, e.g. alumina impregnated with high concentrations of sodium hydroxide. Conversion of the aluminum to aluminum oxide can be effected under milder conditions by incorporating known oxidation catalysts in the aluminum coating, e.g. iron, mercury, etc.

Upon completion of the conversion of aluminum to alumina, the treated structure can be calcined, e.g. subjected to temperatures of about 400° to 1600° C., particularly when the structure is to be used at high temperatures or as a catalyst support. With alumina hydrates formed at lower temperatures, the coating may be activated thermally by calcining temperatures of the order of 400–600° C. In the case of high temperature application, or where it is desired to thermally destory the organic carrier, it is advantageous to sinter the aluminum oxide at temperatures of the order of 1200° to 1600° C. In air, generally, alpha-alumina is formed at temperatures of about 700° to 1600° C.

The formed structure having an aluminum oxide surface coating can be impregnated with catalytic metals using conventional techniques. Suitable metals for preparing oxidation catalysts include platinum, ruthenium, palladium, silver and copper, or combinations such as silver-chromium, copper-chromium, copper-manganese and the like. Other metals such as iron, chromium, lead, etc. may be employed. The metals may exist in the catalyst initially or during use either in the metallic state or in an oxidized condition. The impregnation of the aluminum oxide support with the catalytically active metal may, for example, be accomplished by dipping the aluminum oxide coated structure into a solution of a salt of an appropriate metal, such as a solution of a platinum salt. After decomposition of the salt by heat, the aluminum oxide is impregnated with the metal or its oxide in a very finely-divided condition.

Example

A stainless steel screen (14 mesh), 3 inches square, was painted with aluminum paint and permitted to dry in air. The paint consisted of 1.5 pound of aluminum/gal. paint in the form of particles of less than 50 microns average size. The coated screen was placed in a pressure vessel on an alumina support containing 2% alkali and treated with saturated steam at 120 p.s.i.g. and 170° C. for 17 hours to convert the aluminum coating to a firmly adherent hydrated aluminum oxide.

The steam treated screen was slowly heated with a gas burner to red heat to burn out residual organic material and to convert the hydrated alumina to alpha-alumina. The cooled screen was then soaked in an alcoholic solution of chloroplatinic acid containing 2% platinum. The wetted screen was drained, then ignited and permitted to cool. The platinum depositing procedure was repeated. Finally, the impregnated screen was heated to red heat.

The catalytic screen so prepared was highly active for methanol oxidation at room temperature. After heating to red heat, there was no change in the appearance of the screen and on repeating the test with methanol, immediate oxidation occurred. There was no apparent deactivation of the catalyst by repeated heating.

What is claimed is:

1. Method of preparing a catalytic structure which comprises the steps of applying a coating of finely divided aluminum powder dispersed in an organic vehicle to a solid preformed support, and converting the aluminum powder to aluminum oxide and removing the organic vehicle by treating the coated support with stream at an elevated temperature between about 100° and 400° C. and at a pressure between about 50 p.s.i.g. and 1000 p.s.i.g., for a period of time sufficient to convert the aluminum powder to aluminum oxide and calcining the resultant coated support at a temperature between about 400° and 1600° C., and then depositing a catalyst on the calcined aluminum oxide coating.

2. The method of claim 1 wherein solid support is a preformed oxidation resistant metal structure.

3. The method of claim 1 wherein saturated steam is employed for the treatment.

4. The method of claim 1 wherein the aluminum powder consists of particles at least 90% of which are less than 50 microns in size.

5. The method of claim 1 wherein the aluminum powder is contacted with alkali during steam treatment.

References Cited

UNITED STATES PATENTS

| 3,147,154 | 9/1964 | Cole et al. | 148—6.3 |
| 3,167,499 | 1/1965 | Haresnape et al. | 252—477 X |
| 3,228,892 | 1/1966 | Cole et al. | 252—477 X |
| 2,042,451 | 6/1936 | Bond et al. | 252—463 X |
| 2,364,317 | 12/1944 | Schaefer | 264—60 X |
| 2,741,822 | 4/1956 | Udy | 264—60 X |
| 2,868,702 | 1/1959 | Brennan | 148—6.3 X |

(Other references on following page)

UNITED STATES PATENTS

| | | | |
|---|---|---|---|
| 2,977,265 | 3/1961 | Forsberg et al. | 264—60 X |
| 3,231,520 | 1/1966 | Leak et al. | 252—463 |

FOREIGN PATENTS

| | | |
|---|---|---|
| 626,559 | 8/1961 | Canada. |
| 23,675 | 9/1911 | Great Britain. |
| 482,104 | 3/1938 | Great Britain. |

ALFRED L. LEAVITT, *Primary Examiner.*

J. R. BATTEN, JR., *Assistant Examiner.*

U.S. Cl. X.R.

148—6.3; 252—477; 264—60